(12) United States Patent
Meschenmoser

(10) Patent No.: US 6,796,929 B2
(45) Date of Patent: Sep. 28, 2004

(54) SELF-ADJUSTING DEFLECTION CONTROLLED ROLL

(75) Inventor: Andreas Meschenmoser, Horgenzell (DE)

(73) Assignee: Voith Paper Patent GmbH, Heidenheim (DE)

(*) Notice: Subject to any disclaimer, the term of this patent is extended or adjusted under 35 U.S.C. 154(b) by 155 days.

(21) Appl. No.: 10/087,978

(22) Filed: Mar. 5, 2002

(65) Prior Publication Data
US 2002/0132712 A1 Sep. 19, 2002

(30) Foreign Application Priority Data
Mar. 6, 2001 (DE) .......................... 101 10 695

(51) Int. Cl.⁷ ................................ B30B 3/04
(52) U.S. Cl. ................... 492/7; 492/6; 492/16; 492/20
(58) Field of Search ............ 492/6, 7, 16, 20; 100/162 B

(56) References Cited

U.S. PATENT DOCUMENTS

| | | | |
|---|---|---|---|
| 5,193,258 A | | 3/1993 | Brown |
| 5,290,223 A | * | 3/1994 | Lehmann ................. 492/7 |
| 5,928,121 A | * | 7/1999 | Stotz et al. ............... 492/7 |
| 6,497,177 B2 | * | 12/2002 | Brendel et al. .......... 100/35 |
| 2002/0088353 A1 | * | 7/2002 | Brendel et al. .......... 100/35 |
| 2003/0199376 A1 | * | 10/2003 | Schnyder et al. ........ 492/7 |

FOREIGN PATENT DOCUMENTS

| | | |
|---|---|---|
| AT | 351927 | 8/1979 |
| DE | 7144301 | 5/1973 |
| DE | 3024570 | 12/1987 |
| DE | 4242022 | 6/1994 |
| DE | 19723519 | 12/1998 |
| DE | 19756077 | 6/1999 |
| EP | 0787912 | 8/1997 |

* cited by examiner

Primary Examiner—I Cuda Rosenbaum
(74) Attorney, Agent, or Firm—Greenblum & Bernstein, P.L.C.

(57) ABSTRACT

A self-adjusting deflection controlled roll comprises a rotating roll jacket, a carrier passing axially through the roll jacket and held rotationally fixedly at its end in racks and at least one supporting member arranged at the carrier and exerting a support force on the inner side of the roll jacket in a pressing plane, with at least one axial end of the roll jacket or an axial continuation associated with it being rotationally mounted by at least one bearing on a non-rotating axial bearing sleeve of a bearing housing secured against rotation extending into the region between the roll jacket or the axial continuation and the carrier, said bearing housing being freely movable relative to the carrier substantially in the pressing plane perpendicular to the roll axis. The roll jacket is radially supported via the axial bearing sleeve of a respective bearing housing transversely to the pressing force plane and is axially fixed at the carrier at an axial end via guide means provided radially between the bearing sleeve of the relevant bearing housing and the carrier and permitting both a tilting moving and a movement of the bearing sleeve relative to the carrier substantially in the pressing plane perpendicular to the roll axis.

30 Claims, 6 Drawing Sheets

SELF-ADJUSTING DEFLECTION CONTROLLED ROLL

CROSS-REFERENCE TO RELATED APPLICATIONS

The present application claims priority under 35 U.S.C. §119 of German Patent Application No. 101 10 695.5 filed on Mar. 6, 2001, the disclosure of which is expressly incorporated by reference herein in its entirety.

BACKGROUND OF THE INVENTION

1. Field of the Invention

The invention relates to a self-adjusting deflection controlled roll comprising a rotating roll jacket, a carrier which passes axially through the roll jacket and which is rotationally fixedly held at its ends in racks, and at least one support member arranged at the carrier and exerting a support force on the inner side of the roll jacket in a pressing plane, with at least one axial end of the roll jacket or an axial continuation associated with this being rotatably mounted by at least one bearing on a non-rotating axial bearing sleeve of a bearing housing secured against rotation extending into the region between the roll jacket or the axial continuation and the carrier, said bearing housing being freely movable relative to the carrier substantially in the pressing plane perpendicular to the roll axis. A self-adjusting deflection controlled roll of this kind is known, for example, from EP-A-0 787 912.

2. Discussion of Background Information

Such adjustable deflection rolls are frequently used in practice in the pressing and smoothing sections of paper making machines, wherein they can in particular be designed as so-called self-adjusting rolls in which the roll jacket can be displaced by several centimeters relative to the carrier, in particular by the support members, in order to open and close the pressing jacket.

In the deflection controlled roll known from EP-A-0 787 912, the relevant bearing housing is guided outside the bearing sleeve in the pressing plane perpendicular to the roll axis at a guide ring rotatably held at the carrier and comprising a guide flange and rotatably and tiltably held at the carrier by a pivot bearing with a spherical bearing surface. The roll jacket can be secured against rotation at the carrier by guide members axially arranged between the bearing sleeve and a radial ring surface of the carrier.

SUMMARY OF THE INVENTION

It is the aim of the invention to provide an improved deflection controlled roll of the kind initially named. In this connection, among other things, a bearing which is as compact as possible and self-guiding as possible and an introduction of force which is as central as possible in the region of this bearing should be achieved.

This object is satisfied in accordance with the invention in that the roll jacket is radially supported at the carrier transversely to the pressing force plane via the axial bearing sleeve of a respective bearing housing and is axially fixed at the carrier at an axial end via a guide device radially provided between the bearing sleeve of the relevant bearing housing and the carrier and allowing both a tilting movement and a movement of the bearing sleeve substantially in the pressing plane perpendicular to the roll axis. In this connection, the guide device radially provided between the bearing sleeve and the carrier are preferably arranged in an axially central region of the bearing sleeve and/or centered relative to this bearing sleeve in an axial direction.

With this design, in particular an extremely compact, self-guiding bearing results in whose region a central force introduction is possible. Moreover, the bearing housing is always oriented in accordance with the roll jacket independently of the respective roll strain or roll deflection so that in particular no tilting can occur between the roll jacket and the bearing housing even with a more pronounced roll deflection. Jamming effects are practically precluded in the region of the guide device allowing a tilting movement. Both the radial guiding and the axial guiding of the roll jacket are ensured at the same time via the relevant transmission bearing.

The bearing sleeve is expediently also supported radially at the carrier transversely to the pressing plane via the guide means.

In a preferred practical embodiment of the deflection controlled roll in accordance with the invention, the guide device includes at least one guide member rotatably mounted in the bearing sleeve or the carrier about an axis perpendicular to the pressing plane, said guide member sliding as a follower in a guide provided at the carrier or at the bearing sleeve and being displaceably guided by this substantially parallel to the pressing plane perpendicular to the roll axis. In this connection, these guide devices can in particular include at least two follower-like guide members provided at opposing sides of the carrier and respectively cooperating with a guide.

The guide cooperating with a respective guide member can, for example, be formed at a counter-plate secured at the carrier or at the bearing sleeve.

The guide member rotatably mounted in the bearing sleeve or in the carrier can in particular be formed by a spigot with a collar or the like.

The roll jacket is advantageously axially fixed at the carrier at the axial end at the drive side via the guide means associated with a relevant bearing housing.

The roll jacket is advantageously supported radially at the carrier at the other axial end, preferably at the guide side, transversely to the pressing force plane via the axial bearing sleeve of a relevant bearing housing, but axially displaceable relative to said carrier. In this connection, the bearing sleeve of the relevant bearing housing is expediently radially supported at the carrier via at least two bearing members which are arranged at mutually opposing carrier sides and which are each rotatably mounted in the bearing sleeve or in the carrier about an axis perpendicular to the pressing plane. The bearing members rotatably mounted in each case in the bearing sleeve or the carrier about an axis perpendicular to the pressing plane can cooperate with a counter surface which is preferably formed by a counter plate secured to the carrier or to the bearing sleeve.

In a preferred practical embodiment of the deflection controlled roll in accordance with the invention, at least one piston in cylinder arrangement acting generally in the pressing plane perpendicular to the roll axis is provided radially between the bearing sleeve of a respective bearing housing and the carrier. In this respect, at least one piston in cylinder arrangement arranged at the support member side of the carrier and/or at least one piston in cylinder arrangement arranged at the opposite carrier side can be provided.

Such a piston in cylinder arrangement can in particular serve to relieve the roll jacket of the weight force acting outside the working width of the roll jacket and/or to load or relieve the respective jacket end in order to influence the pressing force distribution in the press nip by controlled pressure medium loading and/or to fix the roll jacket in place in a position raised by a counter roll by shutting off the pressure medium backflow from the piston in cylinder arrangement.

The bearing sleeve of a respective bearing housing can in particular be provided in the region of a carrier spigot which is narrowed relative to the axially central region of the carrier. The piston in cylinder arrangement can thus in particular be arranged between the narrowed carrier spigot and the bearing bush, where there is sufficient room available.

The piston of the piston in cylinder arrangement loading the bearing sleeve can comprise a relief chamber fed with pressure fluid at the side of the piston confronting the bearing sleeve, whereby the axial forces or friction forces which occur can be reduced. In this connection, the relief chamber can be fed via at least one capillary. The feeding of the relief chamber can take place via the pressure chamber of the piston in cylinder arrangement through the piston or from the side of the bearing sleeve.

The piston in cylinder arrangement can directly contact the inner side of the bearing sleeve or a shallow side of an intermediate member arranged between the carrier and the bearing sleeve. In the latter case, the advantage results that the piston does not have to be matched to the curved inner side of the guide sleeve.

In a preferred practical embodiment, at least one axial end of the roll jacket or the axial continuation associated with this is rotatably mounted on the bearing sleeve by two bearings axially spaced apart. In this connection, the two axially spaced apart bearings are preferably formed in each case by a roller bearing.

The deflection controlled roll can be designed as a single-zone roll, in which at least the support members can be loaded with the same pressure, or as a multi-zone roll, in which at least some of the support members can be loaded with different pressures.

In a preferred practical embodiment, the drive-side axial end of the roll jacket or the axial continuation associated with this carries a ring gear serving for the roll drive at the radial outside.

It is of advantage if the axial centers of the gear ring, of the bearing arrangement rotatably holding the roll jacket at the bearing housing, of the guide device and/or of the piston in cylinder arrangement essentially lie in a common plane extending perpendicular to the roll axis. It is thus excluded that torques arise in operation which can act disadvantageously on the toothed engagement of the drive toothed arrangement so that the toothed flanks can ideally contact one another within the framework of the bearing clearances in the main bearings.

In particular a favorably priced deflection adjustment roll for compact and lever free press arrangements can be realized on the basis of the solution in accordance with the invention. The roll can be oscillation damping and is suitable for fast-running paper making machines. Only one universally usable deflection adjusting roll type is required for all DuoCentri presses, combination presses and free standing presses with a nip width of less than or equal to 5200 mm ("lean standard").

In contrast to the previously usual self-adjusting deflection controlled rolls, the bearing or transmission housing and the roll jacket can be mounted inside the roll jacket hollow spigot in that a collar hub or bearing sleeve connected to the bearing housing accepts the non-rotating inner bearing ring. This non-rotating bearing sleeve at the same time takes on the task of radial roll jacket support transversely to the nip direction.

The axial fixing of the roll jacket to the carrier can take place via the guide part at the drive side which is rotatably inserted into the bearing sleeve and which is guided as a follower in the nip direction, for example in a counter plate secured to the carrier. The radial and axial guiding of the roll jacket is thus given at the same time by the transmission bearing correspondingly designed therefor.

The previously usual expensive self-aligning roller bearing, with follower track, arranged at the jacket end can be omitted. The support members or support sources can thus be placed more closely to the roll rim.

A hydraulic pressure piston can be arranged at the centre of the transmission beneath the non-rotating bearing sleeve provided in particular as a follower ring, with a loading being possible in and/or opposite to the nip direction by one or more hydraulic pressure pistons.

It is, for example, possible to set a variable cambering by the pressure pistons arranged far outside at both sides in that, for example, a single zone hydrostatic support source row is loaded at the same time as the pressure pistons.

When the pressing rolls are arranged at the top, the pressure pistons arranged beneath the bearing simultaneously serve the jacket raising.

The housing can be in one part due to the transmission bearings arranged inside the hollow spigot or the axial continuation, whereas it was previously in three parts. The radial shaft sealing ring normally arranged between the transmission housing and the roll spigot and forming a wear part can thus be replaced very easily without the transmission housing having to be taken apart and resealed. The roll bearing can remain in place.

The gear ratio between the pinion and the outer toothing at the hollow spigot is much more favorable so that, at machine speeds of between 1000 and 1500 m/min for example, the ideal gear ratios can be realized in the same transmission housing without a model change. For instance, in particular a direct drive with a motor, without an additional transmission, is possible. A saving in construction room and costs accordingly results.

Simpler carrier design possibilities result with a box section and, in the case of single zone design, cylinder blocks. The roll becomes lighter and has a low-notch transition at the carrier end. The oil backflow can be realized, for example, in the section hollow chambers.

As hydrostatic counter support sources can be omitted in the jacket region, lower roll jacket deformations (oval shell deformation) result. Even thinner jacket wall thicknesses than with the previously usual self-adjusting multi-zone deflection controlled rolls are perhaps possible.

A lower energy consumption results with the counter forces applied by the outlying pistons (without capillary).

A simpler, freely designable support design is possible, with the guide side and the drive side being similar. The roll has fewer components and now only four anti-friction bearings (two bearing types). The roll is substantially lighter for roll diameters (e.g. $\geq 700$ nm) required by the technology than a previously usual floating roll.

The previously known, frequently problematic transmission vibrations in the conventional self-adjusting deflection adjustment rolls as a result of the cantilever support subjected to low load can now be suppressed or damped by the piston force support and by the friction influence at the axial and radial jacket guide. In comparison to the previously usual self-adjusting deflection adjustment rolls, lower manufacturing costs result for the roll, which is in particular due to the reduction in parts and the simpler carrier design. Moreover, a much more favorable and simpler control is possible.

Substantial arrangement advantages result with respect to the previously usual floating roll with an outer pressing system via levers. These include, for example, a simpler and more cost favorable roll stool, a simpler felt and roll replacement, a more compact design despite the larger roll (more free space for the arrangement of scrapers, spray tubes, suction bladders, etc.), planning benefits for conversion work with low construction space and a simple design which is service friendly, operator friendly and safe in operation.

The roll design in accordance with the invention is suitable both for steel jackets and for elastomer jackets. Since no pre-crowning is required at the internally supported roll with the elastomer jacket, the pistons arranged under the roll bearing can be used as carrier pistons for the overhanging loads (transmission and bearing). As already mentioned, the roll can also be designed as a multi-zone roll and be used outside the press part, e.g. in smoothing works.

To keep the axial force of the main bearings as a consequence of the jacket or carrier expansion small, the contact surface from the piston to the bearing sleeve can be provided with at least one hydrostatic relief chamber fed through a capillary. The actual axial force or friction force in this case is only:

$Fa = \text{sleeve surface} \times P \times \mu$, where $P$=pressure and $\mu$=friction coefficient.

A further advantage also lies in particular in the central force introduction of stroke piston, bearing, pinion, torque support (inside or outside the housing) and radial forces through the roll jacket. A symmetrical bearing load results from all radial forces. Moreover an optimum pinion engagement is ensured, which means that a stalling of the transmission as a result of bearing clearances is practically precluded. The load piston can lie approximately in the center of gravity of the transmission and can therefore be ideally used also and in particular for torque-free jacket rim relief for elastomer rolls.

A further particular advantage can in particular also be seen in the compact self-guiding bearing (main bearing and guide bearing in one ready for installation). The arrangement of the joint centre line for force, bearing and pinion close to the carrier support allows an ideal line force curve, in particular for a one-zone design. The stretch load deviations are the lower, the closer the pistons directed opposite support sources are arranged at the carrier support.

A simpler assembly and dismantling results overall (no bearing adjustment—unlike separate taper rolling bearings). Fewer bearings and fewer types of bearings are required. No over-determination of the bearings is present. All in all, a more favorable cost solution is achieved. A more favorable carrier design is possible in the spigot transition region.

The present invention is directed to a self-adjusting deflection controlled roll that includes a rotating roll jacket, a carrier arranged to axially pass through the roll jacket and structured to be held rotationally fixedly at its axial ends, and at least one supporting member structured and arranged at the carrier to exert a support force on an inner side of the roll jacket in a pressing plane. A bearing housing includes a non-rotating axial bearing sleeve with at least one bearing, and at least one of an axial end of or an axial continuation of the roll jacket is rotatably mounted by the at least one bearing on the non-rotating axial bearing sleeve. The bearing housing is secured against rotation and extends into a region between the at least one of the axial end or axial continuation of the roll jacket and the carrier. Further, the bearing housing is structured and arranged to be freely movable relative to the carrier substantially in the pressing plane, and the roll jacket is radially supported transversely to the pressing plane by the non-rotating axial bearing sleeve. A guide device, positioned at an axial end of the carrier and radially between the bearing sleeve and the carrier, is structured and arranged to permit both a tilting moving and a movement of the bearing sleeve relative to the carrier substantially in the pressing plane, and the roll jacket being axially fixed at the axial end of the carrier by the guide device.

According to a feature of the invention, the guide device is arranged in at least one of an axially central region of the bearing sleeve and centered relative to the bearing sleeve in an axial direction.

In accordance with another feature of the instant invention, the bearing sleeve is radially supported at the carrier transversely to the pressing plane via the guide device.

Further, the guide device includes at least one guide member rotatably mounted in one of the bearing sleeve and the carrier about an axis perpendicular to the pressing plane. The at least one guide member is structured and arranged to slide as a follower in a guide provided at one of the carrier or the bearing sleeve and to be displaceably guided essentially parallel to the pressing plane. Further still, the at least one guide member includes at least two follower-like guide members provided on mutually opposite sides of the carrier and each cooperating with a respective guide. The guide, arranged to cooperate with the at least one guide member, is formed at a counter plate secured to the one of the carrier or the bearing sleeve.

According to still another feature of the present invention, the guide member includes comprises a flange with a collar.

The roll jacket is axially fixed to the axial end of the carrier at a drive side via the guide device. Further, the roll jacket is supported radially at a guide side opposite the drive side transversely to the pressing plane via the axial bearing sleeve, and is axially displaceable. The bearing sleeve is radially supported at the carrier via at least two bearing members arranged at mutually opposite carrier sides, and the bearing members are rotatably mounted in one of the bearing sleeve or the carrier for rotation about an axis perpendicular to the pressing plane. Still further, the bearing members cooperate with a counter surface which is formed by a counter plate secured to one of the carrier or the bearing sleeve.

In accordance with a further feature of the invention, at least one piston in cylinder arrangement is structured and arranged to act generally in the pressing plane is provided radially between the bearing sleeve and the carrier. The at least one piston in cylinder arrangement is positioned at least one of a support member side of at least one of the carrier and at an opposite carrier side. The piston in cylinder arrangement is positioned to at least one of relieve the roll jacket from weight forces acting outside a working width of the roll jacket, one of load or relieve a respective jacket end in order to influence a pressing force distribution in a press nip by controlled pressure medium loading, or fix the roll jacket in place in a position raised from a counter roll by shutting off a pressure medium backflow from the piston in cylinder arrangement.

Moreover, the bearing sleeve is positioned in a region of a carrier spigot narrowed with respect to an axially central region of the carrier. A piston in cylinder arrangement is arranged between the narrowed carrier spigot and the bearing sleeve.

Further still, a piston of a piston in cylinder arrangement structured and arranged to act on the bearing sleeve comprises a relief chamber fed with pressure fluid at a side confronting the bearing sleeve. The relief chamber is fed via at least one capillary. The feeding of the relief chamber takes place via a pressure chamber of the piston in cylinder arrangement and through the piston. A feeding of the relief chamber takes place from a side of the bearing sleeve.

According to another feature of the instant invention, a piston of a piston in cylinder arrangement is arranged to directly contact an inner side of the bearing sleeve.

In accordance with a still further feature, a piston of a piston in cylinder arrangement is arranged to contact a shallow side of an intermediate member arranged between the carrier and the baring sleeve.

The at least one of the axial end of or the axial continuation of the roll jacket is rotatably mounted at the bearing sleeve by two axially spaced apart bearings. The two axially spaced apart bearings are each formed by a rolling bearing.

Still further, the at least one supporting member can include a plurality of supporting members arranged to form a single-zone roll, such that the plurality of supporting members are loaded with a same pressure. Alternatively, the at least one supporting member can include a plurality of supporting members arranged to form a multi-zone roll, such that at least some of the plurality of supporting members are loaded with different pressures.

The at least one of the axial end of or the axial continuation of the roll jacket is located at a drive side is arranged to outwardly radially carry a gear ring structured and arranged to the roll drive. Axial centers of at least one of the gear ring, the bearing arrangement, the guide device, and a piston in cylinder arrangement lie substantially in a common plane perpendicular to a roll axis.

According to still another feature of the invention, frames are arranged to rotationally fixedly hold the ends of the carrier.

In accordance with yet another feature of the present invention, the pressing plane is perpendicular to a roll axis.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

FIGS. 1 to 6 show a self-adjusting deflection controlled roll 10 in a purely schematic representation.

This deflection controlled roll 10 includes a rotating roll jacket 12 and a carrier 14 passing through it axially.

Figure 1:
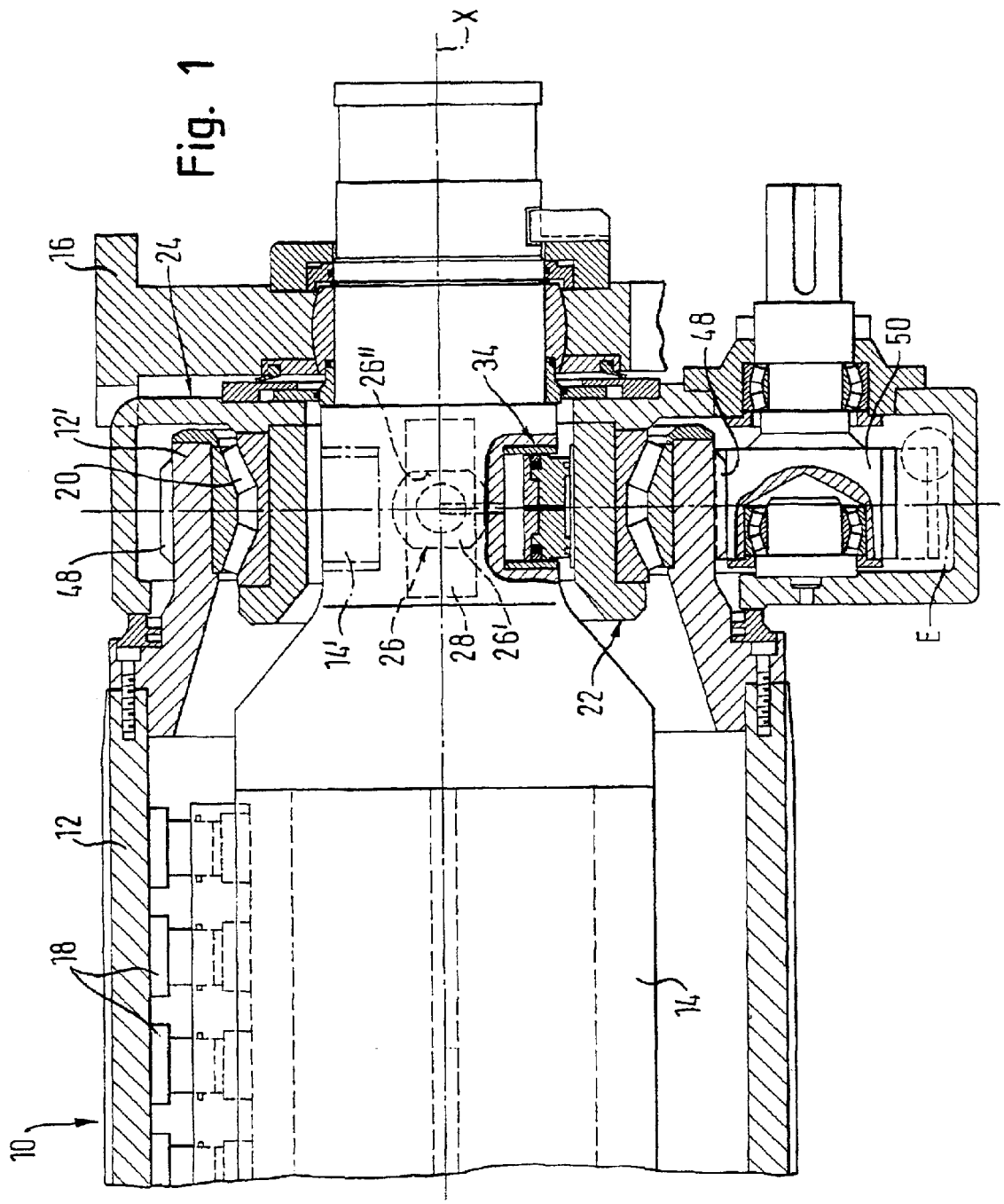
FIG. 1 a schematic longitudinal section of the drive-side end of a first embodiment of a self-adjusting deflection adjustment roll.

The carrier 14 is held rotationally fixedly at its sides in racks 16, with only the drive-side rack 16 being shown in FIG. 1.

As can again best be seen with reference to FIG. 1, a plurality of support members 18 exerting a support force in a pressing plane are provided at the carrier 14, with these, for example, being able to be hydrostatic or hydrodynamic support members.

The two axial ends of the roll jacket 12 or axial continuations 12' associated with these are each rotatably mounted by two axially spaced rolling bearings 20 on a non-rotating axial collar hub or bearing sleeve 22 of a bearing housing 24 secured against rotation extending into the region between the axial continuation 12' and the carrier 14. Substantially in the press plane perpendicular to the roll axis X, the bearing housing 24 is freely movable to the carrier 14.

The roll jacket 12 is radially supported at the carrier 14 both on the drive side and on the guide side via the axial bearing sleeve 22 of the relevant bearing housing 24 in each case transversely to the pressing force plane.

As can in particular be recognized with reference to FIGS. 1 to 3 and 6 (right hand half), the roll jacket 12 is moreover axially fixed at the carrier 14 at the drive-side axial end via guide device 26 provided radially between the bearing sleeve 22 of the bearing housing 24 and the carrier 14. These guide devices 26 allow both a tilting movement and a movement of the bearing sleeve 22 relative to the carrier 14 substantially in the pressing plane perpendicular too the roll axis.

As can best be recognized with reference to FIG. 1, the guide device 26 provided radially between the bearing sleeve 22 and the carrier 14 are arranged in an axially central region of the bearing sleeve 22 or central to this bearing sleeve 22 in the axial direction.

Figure 2:
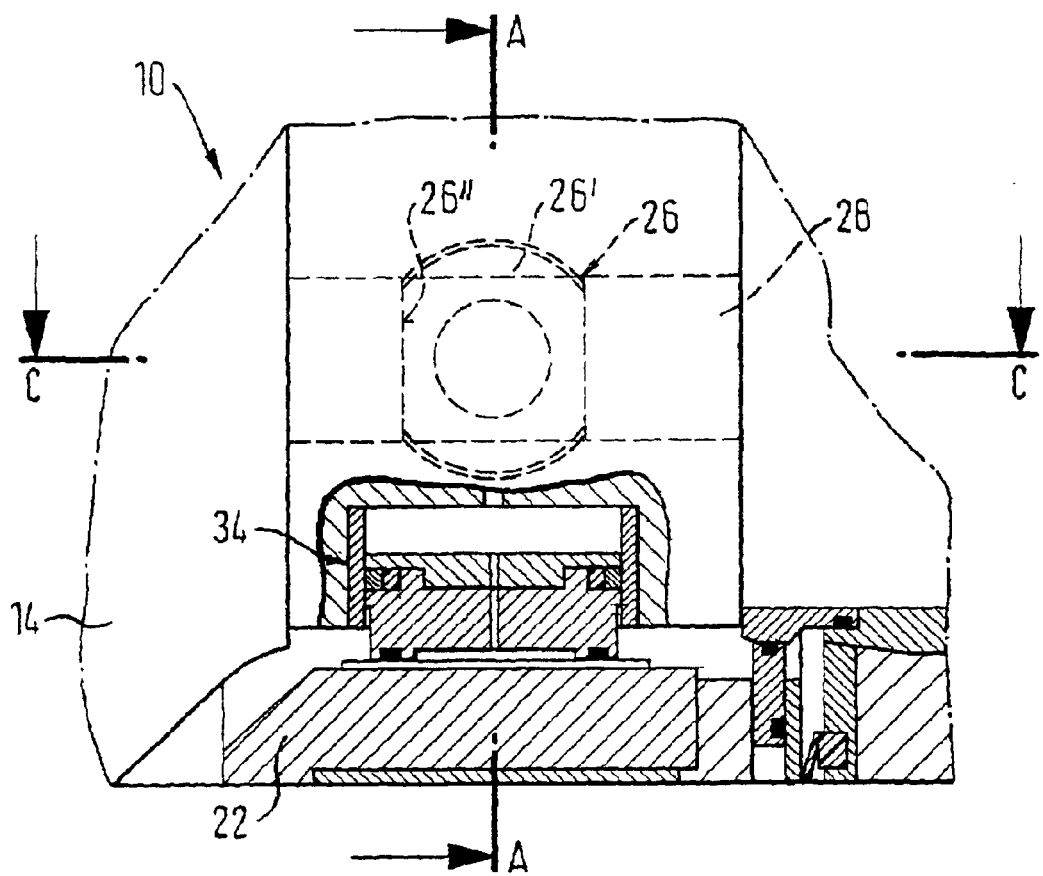
FIG. 2 an enlarged illustration of the axial and radial roll guide provided at the drive-side end of the deflection controlled roller in accordance with FIG. 1.
Figure 3:
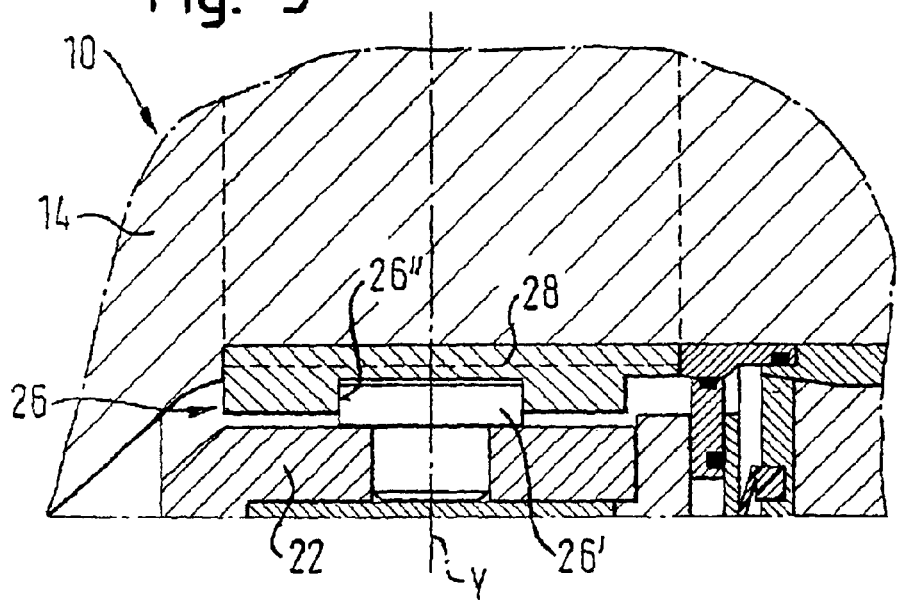
FIG. 3 a section along the line C—C in FIG. 2.
Figure 6:
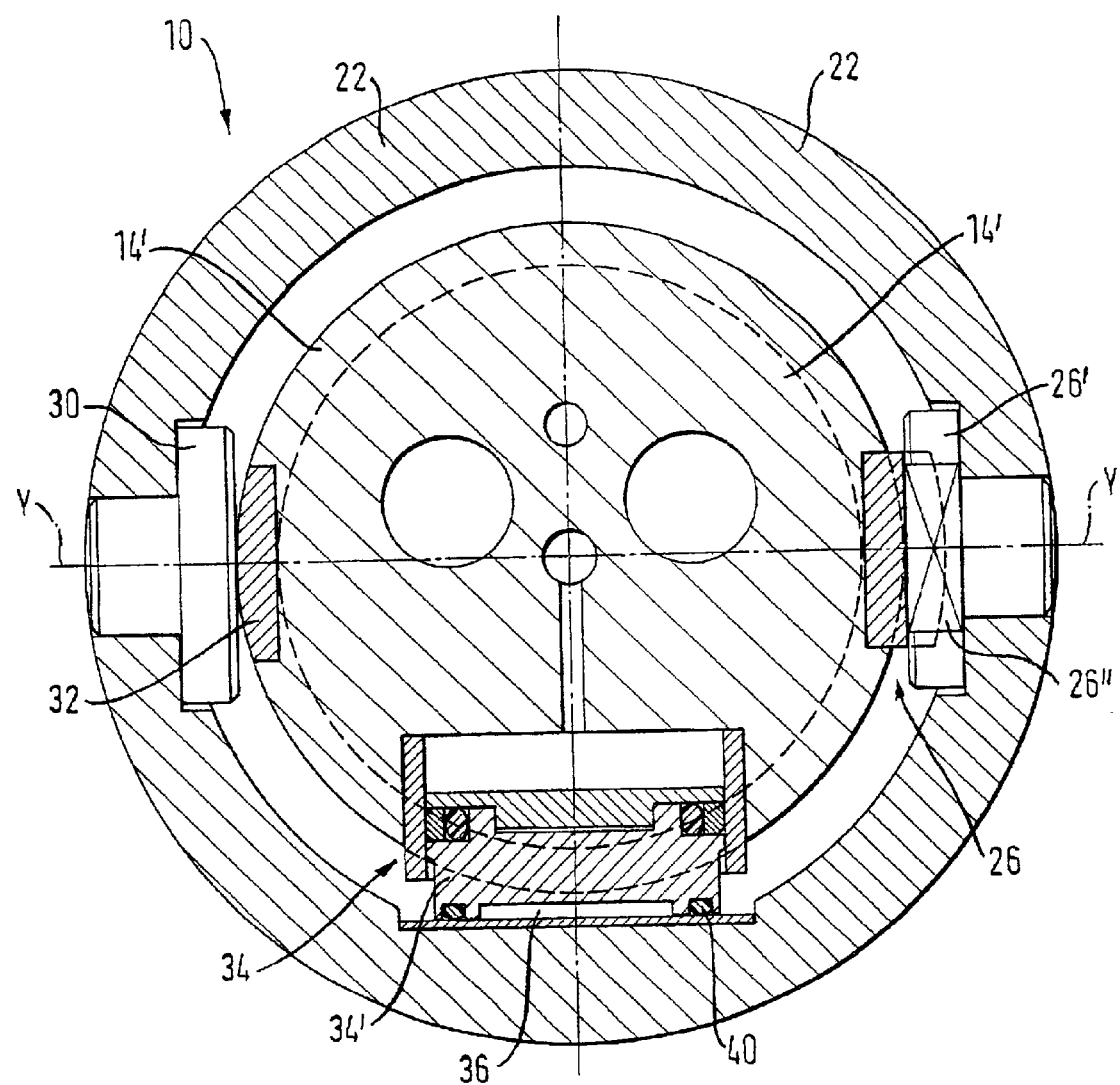
FIG. 6 in the right hand half, a section along the line A—A in FIG. 2 of the axial and radial roll guide at the drive side; and in the left hand half a section along the line B—B in FIG. 4 of the radial roll guide at the guide side.

The bearing sleeve is not only fixed to the carrier 14 axially via these guide devices, but at the same time also supported radially at the carrier transversely to the pressing plane (cf. in particular also FIGS. 2, 3 and 6; right hand half).

In the present embodiment, the guide means 26 include two guide members 26' which are provided at mutually opposing sides of the carrier 14, which are each rotatably mounted about an axis Y perpendicular to the pressing plane (cf. in particular FIGS. 3 and 6), which slide as a follower in a guide 26" provided at the carrier 14 and are displaceably guided by these substantially parallel to the pressing plane perpendicular to the roll axis X. In this connection, the guide 26" cooperating with a respective guide member 26' can be made at a respective counter plate 28 secured to the carrier 14. In the present case, the guide 26" is formed by a straight line groove provided in the counter plate 28. In the present case a fixed bearing thus results.

As can be seen with reference to FIGS. 1 to 3 and 6 (right hand half), the guide members 26' can each be formed by a spigot with a collar or the like. In the present case, the flange is flattened at two mutually opposite sides which cooperate with the relevant mutually opposite sides of the guide 26" (cf. in particular FIG. 2). While a respective guide member or spigot with a collar 26' is thus rotatable in the bearing sleeve 22, it is not rotatable in the guide 26".

Figure 4:
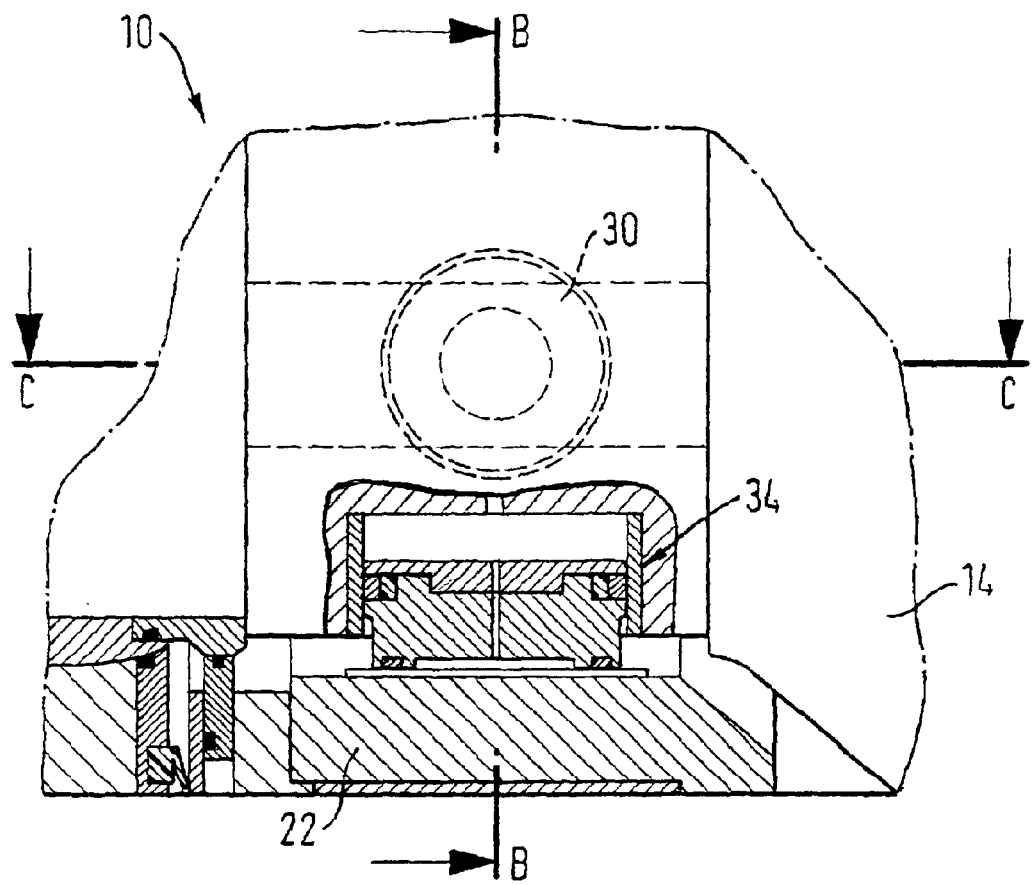
FIG. 4 an enlarged illustration of the radial roll guide provided at the guide-side end of the deflection controlled roll in accordance with FIG. 1.
Figure 5:
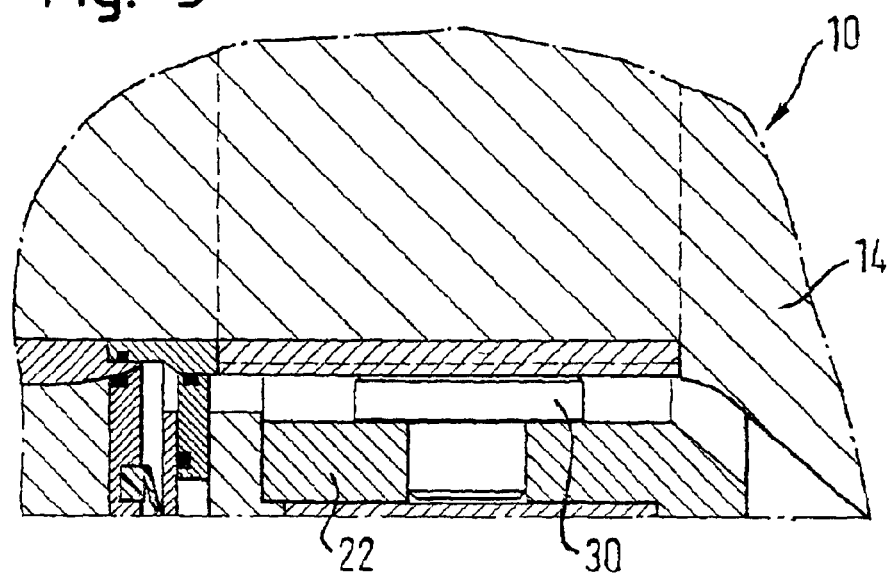
FIG. 5 a section along the line C—C in FIG. 4.

The roll jacket 12 is admittedly likewise radially supported at the carrier 14 transversely to the pressing force plane via the axial bearing sleeve 22 at the other axial end at the guide side, but it is axially displaceable relative to this (cf. FIGS. 4, 5 and 6; left hand half). In this connection, the bearing sleeve 22 of the relevant bearing housing 24 is radially supported at the carrier via two bearing members 30 arranged at mutually opposite carrier sides, said bearing members again each being rotatably mounted in the bearing sleeve 22 about an axis Y perpendicular to the pressing plane. These bearing members 30 can again each also be formed by a spigot with a collar or the like.

In the present case, the bearing members or spigots with a collar 30 respectively rotatably mounted in the bearing sleeve 22 about an axis Y perpendicular to the pressing plane cooperate with a counter surface which is formed by a counter plate 32 secured to the carrier 14. As can be recognized with reference to FIG. 6 (cf. left hand half), the counter surface formed by the counter plate 32 is curved when observed in cross-section and matched to the outer periphery of the carrier 14. It extends in a straight line in the axial direction such that the bearing members 30 are axially displaceable relative to this surface. In the present case, a loose bearing thus results.

At least one piston in cylinder arrangement 34 acting generally in the pressing plane perpendicular to the roll axis X is provided radially between the bearing sleeve 22 of a respective bearing sleeve 24 and the carrier. In this connection, at least one piston in cylinder arrangement 34 can be provided at the support member side of the carrier 14 and/or at least one piston in cylinder arrangement 34 can be provided at the opposite carrier side.

These piston in cylinder arrangements 34 can serve, for example, to relieve the roll jacket 12 from the weight forces acting outside the working width of the roll jacket 12 and/or to load or relieve the respective jacket end in order to influence the pressing force distribution in the press nip by controlled pressure medium loading and/or to fix the roll jacket 12 in place in a position raised from a counter roll by shutting off the pressure medium backflow from the piston in cylinder arrangement 34.

As can again in particular be seen with reference to FIG. 1, the bearing sleeve 22 of a respective bearing housing 24 can be provided in the region of a carrier spigot 14' narrowed with respect to the axially central region of the carrier 14. Accordingly, the piston in cylinder arrangement 34 can be arranged between such a narrowed carrier spigot 14' and the bearing sleeve 22.

As can in particular be recognized with reference to FIGS. 6 to 9, the piston 34' of a respective piston in cylinder arrangement 34 acting on the bearing sleeve 22 can comprise a relief chamber 36 fed with pressure fluid at its side confronting the bearing sleeve 22.

Figure 7:
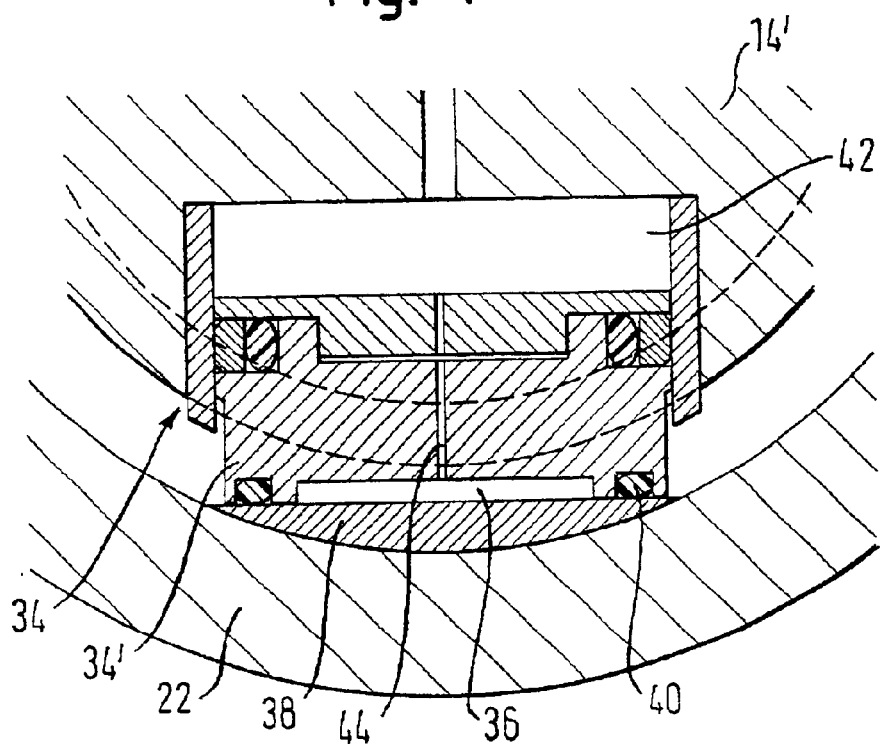
FIG. 7 a schematic cross-section representation of a first embodiment of a piston in cylinder arrangement with a piston contacting the inner periphery of the bearing sleeve via an intermediate member and comprising a relief chamber, with the relief chamber being fed via a capillary.

FIG. 7 shows in a schematic cross-section illustration a first embodiment of such a piston in cylinder arrangement 34 in which the piston 34' contacts the inner periphery of the bearing sleeve 22 via an intermediate member 38. In this connection, the piston 34' is sealed relative to this intermediate member 38 via a seal 40. The relief chamber 36 is fed with pressure fluid via the pressure chamber 42 of the piston in cylinder arrangement 34 via a capillary 44 through the piston 34'.

Figure 8:
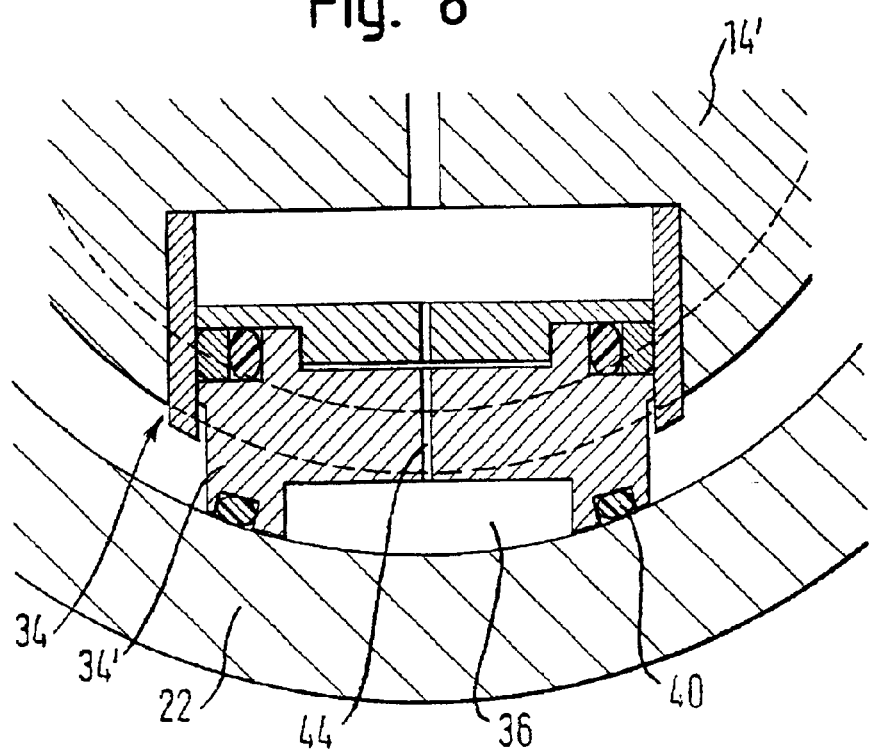
FIG. 8 a schematic cross-section representation of a further embodiment of a piston in cylinder arrangement with a piston directly contacting the inner periphery of the bearing sleeve and comprising a relief chamber, with the relief chamber again being fed via a capillary.

FIG. 8 shows in a schematic cross-section illustration a further embodiment of a piston in cylinder arrangement 34 with a piston 34' which comprises a relief chamber 36 fed via a capillary 44. In this case, the piston 34' contacts the inner periphery of the bearing sleeve 22 directly. The piston 34' is sealed relative to the bearing sleeve 22 via a seal 40.

Figure 9:
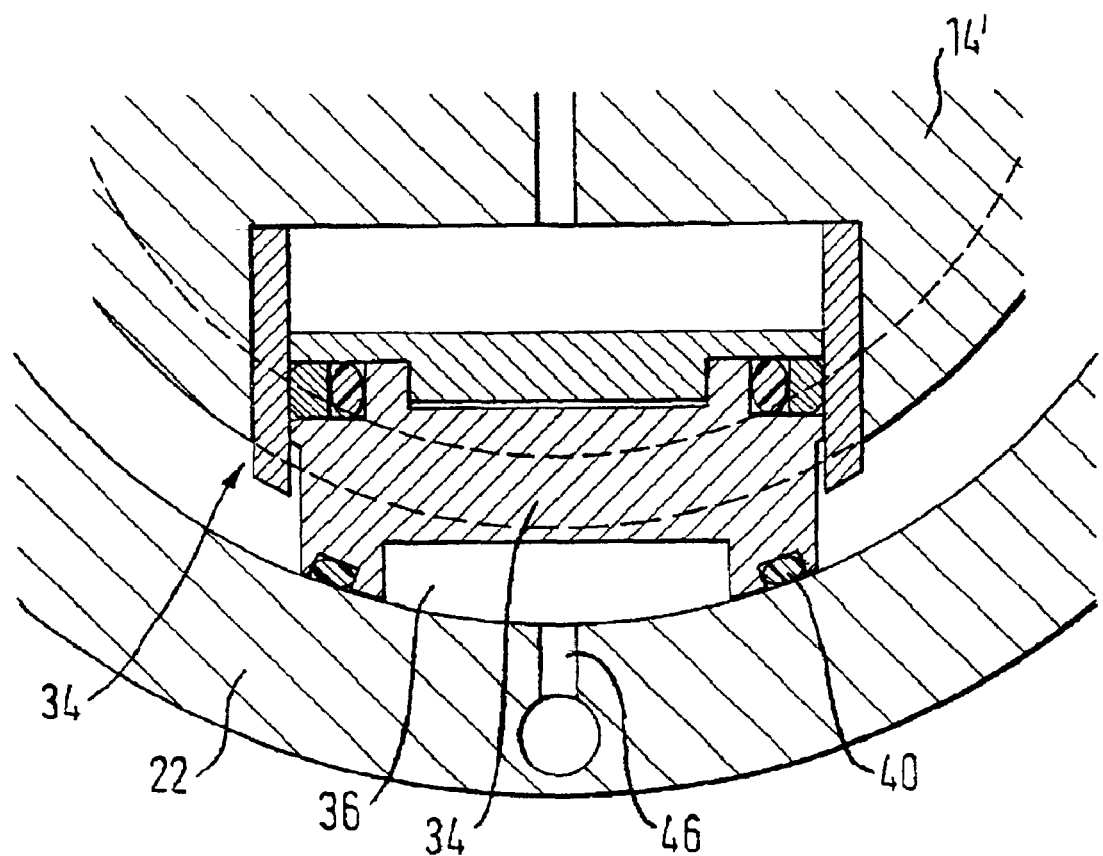
FIG. 9 an embodiment of a piston in cylinder arrangement comparable with that of FIG. 8, in which the relief chamber of the piston is, however, fed via an unrestricted passage.

FIG. 9 shows an embodiment of a piston in cylinder arrangement 34 comparable with that of FIG. 8 in which the relief chamber 36 is, however, fed via an unrestricted passage 46 from the side of the bearing sleeve 22. The piston 34' is again sealed relative to the inner periphery of the bearing sleeve 22 via a seal 40.

In the embodiment in accordance with FIG. 7, the piston 34' of the piston in cylinder arrangement 34 contacts a shallow side of the intermediate member 38 arranged between the carrier 14 or the carrier spigot 14' and the bearing sleeve 22. This provides the advantage that the piston 34' does not have to be matched to the curved inner periphery of the bearing sleeve 22.

The deflection controlled roll 10 can be made as a single-zone roll in which at least the support members 18 can be loaded with the same pressure or also as a multi-zone roll in which at least some of the support members 18 can be loaded with different pressures.

As can be see with reference to FIG. 1, the axial end of the roll jacket 12 at the drive side or the axial continuation 12' associated with this end radially outwardly carries a ring gear 48 serving for the roll drive which meshes with a drive pinion 50.

The axial centers of the ring gear 48, of the bearing arrangement 20 rotatably holding the roll jacket 12 at the bearing housing 24, of the guide device 26, of the piston in cylinder arrangement 34 and/or of the pinion 50 can, as shown in FIG. 1, substantially lie in a common plane E standing perpendicular to the roll axis X.

In the present case, the bearing housing 24 is secured against rotation at the rack 16. Such a rotation security can generally also take place within the bearing housing 24.

It is noted that the foregoing examples have been provided merely for the purpose of explanation and are in no way to be construed as limiting of the present invention.

While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

Reference Numeral List
10 deflection controlled roll
12 roll jacket
12' axial continuation
14 carrier
14' carrier spigot
16 rack
18 support member
20 rolling bearings
22 bearing sleeve
24 bearing housing
26 guide device
26' guide member
26" counter plate
30 bearing member
32 counter plate
34 piston in cylinder arrangement
34' piston
36 relief chamber
38 intermediate member
40 seal
42 pressure chamber
44 capillary
46 passage
48 gear ring
50 drive pinion
E plane
X roll axis
Y rotational axis

What is claimed is:

1. A self-adjusting deflection controlled roll comprising:
    a rotating roll jacket;
    a carrier arranged to axially pass through said roll jacket and structured to be held rotationally fixedly at its axial ends;
    at least one supporting member structured and arranged at said carrier to exert a support force on an inner side of said roll jacket in a pressing plane;
    a bearing housing comprising a non-rotating axial bearing sleeve with at least one bearing;
    at least one of an axial end of or an axial continuation of said roll jacket being rotatably mounted by said at least one bearing on said non-rotating axial bearing sleeve;
    said bearing housing being secured against rotation and extending into a region between said at least one of said axial end or axial continuation of said roll jacket and said carrier;
    said bearing housing being structured and arranged to be freely movable relative to said carrier substantially in the pressing plane;
    said roll jacket being radially supported transversely to the pressing plane by said non-rotating axial bearing sleeve;
    a guide device, positioned at an axial end of said carrier and radially between said bearing sleeve and said carrier, being structured and arranged to permit both a tilting moving and a movement of said bearing sleeve relative to said carrier substantially in the pressing plane; and
    said roll jacket being axially fixed at said axial end of said carrier by said guide device.

2. The deflection controlled roll in accordance with claim 1, wherein said guide device is arranged in at least one of an axially central region of said bearing sleeve and centered relative to said bearing sleeve in an axial direction.

3. The deflection controlled roll in accordance with claim 1, wherein said bearing sleeve is radially supported at said carrier transversely to the pressing plane via said guide device.

4. The deflection controlled roll in accordance with claim 1, wherein said guide device comprises:
    at least one guide member being rotatably mounted in one of said bearing sleeve and said carrier about an axis perpendicular to the pressing plane; and
    said at least one guide member being structured and arranged to slide as a follower in a guide provided at one of said carrier or said bearing sleeve and to be displaceably guided essentially parallel to the pressing plane.

5. The deflection controlled roll in accordance with claims 4, wherein said at least one guide member comprises at least two follower-like guide members provided on mutually opposite sides of said carrier and each cooperating with a respective wide.

6. The deflection controlled roll in accordance with claim 4, wherein said guide, arranged to cooperate with said at least one guide member, is formed at a counter plate secured to said one of said carrier or said bearing sleeve.

7. The deflection controlled roll in accordance with claim 1, wherein said guide member comprises a flange with a collar.

8. The deflection controlled roll in accordance with claim 1, wherein said roll jacket is axially fixed to said axial end of said carrier at a drive side via said guide device.

9. The deflection controlled roll in accordance with claim 8, wherein said roll jacket is supported radially at a guide side opposite said drive side transversely to the pressing plane via said axial bearing sleeve, and is axially displaceable.

10. The deflection controlled roll in accordance with claim 9, wherein said bearing sleeve is radially supported at said carrier via at least two bearing members arranged at mutually opposite carrier sides, and
    said bearing members are rotatably mounted in one of said bearing sleeve or said carrier for rotation about an axis perpendicular to the pressing plane.

11. The deflection controlled roll in accordance with claim 10, wherein said bearing members cooperate with a counter surface which is formed by a counter plate secured to one of said carrier or said bearing sleeve.

12. The deflection controlled roll in accordance with claim 1, wherein at least one piston in cylinder arrangement structured and arranged to act generally in the pressing plane is provided radially between said bearing sleeve and said carrier.

13. The deflection controlled roll in accordance with claim 12, wherein said at least one piston in cylinder arrangement is positioned at at least one of a support member side of at least one of said carrier and at an opposite carrier side.

14. The deflection controlled roll in accordance with claim 12, wherein said piston in cylinder arrangement is positioned to at least one of relieve said roll jacket from weight forces acting outside a working width of said roll jacket, one of load or relieve a respective jacket end in order to influence a pressing force distribution in a press nip by controlled pressure medium loading, or fix said roll jacket in place in a position raised from a counter roll by shutting off a pressure medium backflow from said piston in cylinder arrangement.

15. The deflection controlled roll in accordance with claim 1, wherein said bearing sleeve is positioned in a region of a carrier spigot narrowed with respect to an axially central region of said carrier.

16. The deflection controlled roll in accordance with claim 15, wherein a piston in cylinder arrangement is arranged between said narrowed carrier spigot and said bearing sleeve.

17. The deflection controlled roll in accordance with claim 1, wherein a piston of a piston in cylinder arrangement structured and arranged to act on said bearing sleeve comprises a relief chamber fed with pressure fluid at a side confronting said bearing sleeve.

18. The deflection controlled roll in accordance with claim 17, wherein said relief chamber is fed via at least one capillary.

19. The deflection controlled roll in accordance with claim 17, wherein the feeding of said relief chamber takes place via a pressure chamber of said piston in cylinder arrangement and through said piston.

20. The deflection controlled roll in accordance with claim 17, wherein a feeding of said relief chamber takes place from a side of said bearing sleeve.

21. The deflection controlled roll in accordance with claim 1, wherein a piston of a piston in cylinder arrangement is arranged to directly contact an inner side of said bearing sleeve.

22. The deflection controlled roll in accordance with claim 1, wherein a piston of a piston in cylinder arrangement is arranged to contact a shallow side of an intermediate member arranged between said carrier and said bearing sleeve.

23. The deflection controlled roll in accordance with claim 1, wherein said at least one of said axial end of or said axial continuation of said roll jacket is rotatably mounted at said bearing sleeve by two axially spaced apart bearings.

24. The deflection controlled roll in accordance with claim 23, wherein said two axially spaced apart bearings are each formed by a rolling bearing.

25. The deflection controlled roll in accordance with claim 1, wherein said at least one supporting member comprises a plurality of supporting members arranged to form a single-zone roll, such that said plurality of supporting members are loaded with a same pressure.

26. The deflection controlled roll in accordance with claim 1, wherein said at least one supporting member comprises a plurality of supporting members arranged to form a multi-zone roll, such that at least some of said plurality of supporting members are loaded with different pressures.

27. The deflection controlled roll in accordance with claim 1, wherein said at least one of said axial end of or said axial continuation of said roll jacket is located at a drive side is arranged to outwardly radially carry a gear ring structured and arranged to the roll drive.

28. The deflection controlled roll in accordance with claim 27, wherein axial centers of at least one Of said gear ring, said bearing arrangement, said guide device, and a piston in cylinder arrangement lie substantially in a common plane perpendicular to a roll axis.

29. The deflection controlled roll in accordance with claim 1, further comprising frames arranged to rotationally fixedly hold said ends of said carrier.

30. The deflection controlled roll in accordance with claim 1, wherein the pressing plane is perpendicular to a roll axis.

* * * * *